United States Patent
Juodawlkis et al.

(10) Patent No.: US 9,971,226 B2
(45) Date of Patent: May 15, 2018

(54) OPTOELECTRONIC FILTER AND METHOD FOR SIGNAL SUPPRESSION

(71) Applicant: Massachusetts Institute of Technology, Cambridge, MA (US)

(72) Inventors: Paul W. Juodawlkis, Arlington, MA (US); William Loh, Cambridge, MA (US); Rajeev J Ram, Arlington, MA (US); Siva Yegnanarayanan, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 159 days.

(21) Appl. No.: 14/908,589

(22) PCT Filed: Jul. 31, 2014

(86) PCT No.: PCT/US2014/049141
§ 371 (c)(1),
(2) Date: Jan. 29, 2016

(87) PCT Pub. No.: WO2015/017653
PCT Pub. Date: Feb. 5, 2015

(65) Prior Publication Data
US 2016/0170285 A1    Jun. 16, 2016

Related U.S. Application Data

(60) Provisional application No. 61/861,481, filed on Aug. 2, 2013.

(51) Int. Cl.
*G02F 1/225* (2006.01)
*G02F 1/035* (2006.01)
*G02F 1/21* (2006.01)

(52) U.S. Cl.
CPC ............ *G02F 1/2255* (2013.01); *G02F 1/035* (2013.01); *G02F 1/21* (2013.01); *G02F 2001/212* (2013.01)

(58) Field of Classification Search
CPC .................. G02F 1/2255; G02F 2201/212
(Continued)

(56) References Cited

U.S. PATENT DOCUMENTS

| 5,225,922 A | 7/1993 | Chraplyvy et al. |
| 6,351,323 B1 * | 2/2002 | Onaka .................. H04J 14/0204 359/308 |

(Continued)

OTHER PUBLICATIONS

International Preliminary Report dated Feb. 11, 2016 for PCT Application No. PCT/US2014/049141, 7 pages.
(Continued)

*Primary Examiner* — Seung C Sohn
(74) *Attorney, Agent, or Firm* — Daly, Crowley, Mofford & Durkee, LLP

(57) ABSTRACT

An optoelectronic filter having at least one input and an output includes a modulator circuit having at least first and second inputs with a first one of the modulator circuit inputs adapted to couple to a respective one of the at least one input of the optoelectronic filter. The modulator circuit receives at least a first radio frequency (RF) signal having a first power level and a second RF signal having a second, different power level at the first one of the modulator circuit inputs and in response thereto generates a modulated signal at an output thereof. The first RF signal is suppressed relative to the second RF signal in the modulated signal. The optoelectronic filter additionally includes a light source adapted to couple to a second one of the modulator circuit inputs. A corresponding method is also provided.

20 Claims, 8 Drawing Sheets

(58) Field of Classification Search
USPC .......................................................... 250/226
See application file for complete search history.

(56) References Cited

U.S. PATENT DOCUMENTS

| | | | |
|---|---|---|---|
| 2002/0191886 A1 | 12/2002 | Castoldi et al. | |
| 2008/0212968 A1* | 9/2008 | Lindop | H04B 10/2575 398/91 |
| 2011/0287720 A1* | 11/2011 | Cox | H04B 1/525 455/63.1 |
| 2012/0294608 A1 | 11/2012 | Prucnal | |

OTHER PUBLICATIONS

Search Report and Written Opinion dated Nov. 28, 2014 for PCT Application No. PCT/US2014/049141 8 pages.
William Loh et al. "A nonlinear optoelectronic filter for electronic signal processing"; Scientific Reports; Jan. 9, 2014, 5 pages.
William Loh et al. "A nonlinear optoelectronic filter for electronic signal processing"; Supplementary Information, 7 pages.
William Loh et al. Thesis: "The Physics of Phase-Noise Mitigation: Signal Generation and Filtering Using Microwave-Photonic Links"; Massachusetts Institute of Technology; Sep. 2013; 291 pages.
José Capmany et al. "A Tutorial on Microwave Photonic Filters"; Journal of Lightwave Technology; vol. 24, No. 1; Jan. 2006, 29 pages.
José Capmany et al. "Microwave Photonics combines two worlds"; Review Article; Nature Publishing Group; vol. 1; Jun. 2007, 12 pages.
T. M. Fortier et al. "Generation of ultrastable microwaves via optical frequency division" Natures Photonics; vol. 5; Jun. 26, 2011, 5 pages.
Brian H. Kolner et al. "Intermodulation distortion and compression in an integrated electrooptic modulator" Applied Optics; vol. 26, No. 17; Sep. 1, 1987, 5 pages.
William Loh et al. "Unified Theory of Oscillator Phase Noise I: White Noise" IEEE, Transactions on Microwave Theory and Techniques, vol. 61, No.; Jun. 6, 2013, 11 pages.
Lute Maleki "The optoelectronic oscillator" Nature Photonics, vol. 5; Dec. 2011, 3 pages.
Robert A. Minasian "Photonic Signal Processing of Microwave Signals" IEEE, Transactions on Microwave Theory and Technique, vol. 54, No. 2; Feb. 2006, 15 pages.
X. Steve Yao et al. "Optoelectronic microwave oscillator" Optical Society of America, vol. 13, No. 8; Aug. 1996, 11 pages.
X. Steve Yao et al. "Optoelectronic Oscillator for Photonic Systems" IEEE, Journal of Quantum Electronics; vol. 32, No. 7; Jul. 1996, 9 pages.
William Loh et al."Super-Homogeneous Saturation of Microwave-Photonic Gain in Optoelectronic Oscillator Systems"; IEEE; vol. 4; No. 5; Oct. 2012, 12 pages.
Robert Olshansky "Optimal Design of Subcarrier Multiplexed Lightwave Systems Employing Linearized External Modulators"; Journal of Lightwave Technology, vol. 10, No. 3, Mar. 1992, 5 pages.

* cited by examiner

OPTOELECTRONIC FILTER AND METHOD FOR SIGNAL SUPPRESSION

CROSS REFERENCE TO RELATED APPLICATIONS

This application is a U.S. National Stage of PCT application PCT/US2014/049141 filed in the English language on Jul. 31, 2014, and entitled "OPTOELECTRONIC FILTER," which claims the benefit under 35 U.S.C. § 119 of provisional application No. 61/861,481 filed Aug. 2, 2013, which application is hereby incorporated herein by reference.

STATEMENT REGARDING FEDERALLY SPONSORED RESEARCH

This invention was made with Government support under Contract No. FA8721-05-C-0002 awarded by the U.S. Air Force. The Government has certain rights in the invention.

FIELD

This disclosure relates generally to optoelectronic devices and, more particularly, to the use of optoelectronic filters, techniques, and circuits for signal suppression.

BACKGROUND

As is known in the art, noise degrades the spectral purity of oscillators, such as those commonly found radar systems, communication systems (e.g., including but not limited to cellular communication systems), metrology systems and the like. Due to feedback mechanics of oscillators and to inherent resistance of a saturated oscillator to amplitude fluctuations, noise (e.g., phase noise) can become a significant limitation (and in some cases a dominant limitation) to oscillator performance. Phase noise can, for example, result in spectral broadening of the oscillation line profile of an oscillator across a distribution of frequencies. For many systems (e.g., receiver systems in a communication system), the phase noise of a relatively strong signal (e.g., background noise) can obstruct the detection of comparatively weaker signals (e.g., signals of interest) at nearby frequencies. In essence, the weaker signal is buried beneath the phase noise of the stronger signal. Ideally, a system is capable of filtering out the stronger signal leaving behind the desired, weaker signal. However, such a filtering operation cannot typically be accomplished using conventional all-electronic filters for at least two reasons. First, the bandwidth of the pass band in such a conventional filter is insufficiently narrow to separate one signal from another (e.g., the stronger signal from the weaker signals). Second, even with an appropriate bandwidth, such conventional filters are unable to distinguish the weaker signals from phase noise.

SUMMARY

The present disclosure relates generally to an optoelectronic filter configured to detect weaker signals in the presence of noise of a stronger signal. In one embodiment, the optoelectronic filter is provided as a nonlinear optoelectronic filer capable of resolving a weaker signal beneath the phase noise of a stronger signal when both received signals are passed through the filter. This filter differs from conventional microwave-photonic (MWP) filters as it exploits nonlinearity rather than linear finite impulse response (FIR) or infinite impulse response (IIR) filtering techniques.

In one embodiment, a nonlinear optoelectronic filter has the configuration of a traditional MWP link comprising a laser whose output is intensity modulated by a Mach-Zehnder modulator and subsequently detected by a photodetector. An RF input voltage applied to the modulator varies a refractive index of electro-optic material embedded within the modulator. The Mach-Zehnder interferometer converts this linear change in refractive index into a precise sinusoidal variation in the optical intensity. The stored RF information is recovered upon detection of the optical envelope. Under certain ranges of applied RF voltage, this MWP link exhibits properties similar to a filter, but with functionality unachievable by ordinary filters. In particular, when two signals, one strong and one weak, are passed through the optoelectronic filter, the filter acts to suppress the stronger signal relative to the weaker signal, independent of their separation in frequency.

In one aspect, an optoelectronic filter having at least one input and an output includes a modulator circuit having at least first and second inputs with a first one of the modulator circuit inputs adapted to couple to a respective one of the at least one input of the optoelectronic filter. The modulator circuit is configured to receive at least one of first and second radio frequency (RF) signals at the first one of the modulator circuit inputs. The first and second RF signals have different power levels and in response thereto the modulator circuit generates a modulated signal at an output thereof. By appropriately adjusting the signal levels of at least one of the first or second RF signals, one of the RF signals can be suppressed relative to the other. In particular, when the ratio of the quantity $\pi v_1/V_\pi$, (in which $v_1$ is a voltage level of a first signal and $V_\pi$ is the voltage level required to transition one signal from constructive to destructive interference in the modulator circuit) is in the range of about 3.7 to about 3.9 (and ideally 3.83) one RF signal is substantially suppressed and the other RF signal is proximate a local maximum. Thus, the purpose of the level control is to make the ratio $\pi v_1/V_\pi$, equal to a value of 3.83.

In some embodiments, the first RF signal is suppressed relative to the second RF signal in the modulated signal. In some embodiments, the first RF signal has a power level which is greater than the power level of the second RF signal. In other embodiments, however, the second RF signal may have a power level which is greater than the power level of the first RF signal. The optoelectronic filter additionally includes a light source adapted to couple to a second one of the modulator circuit inputs. The light source is configured to provide a beam having an optical intensity to the second one of the modulator circuit inputs.

The conversion of electrical signals into modulated optical waves and back into electrical signals provides the capacity for low-loss radio-frequency (RF) signal transfer over optical fiber and the unique properties of this microwave-photonic link also enable the manipulation of RF signals beyond what is possible in conventional systems. Such capabilities are achieved by realizing a nonlinear optoelectronic filter, which acts to suppress a stronger RF signal in the presence of a weaker signal independent of their separation in frequency. Using such an optoelectronic filter, a relative suppression of 56 dB for a stronger signal having a 1-GHz center frequency, uncovering the presence of otherwise undetectable weaker signals located as close as 3.5 Hz away has been achieved. The capabilities of the optoelectronic filter described herein break the conventional limits of signal detection, opening up new possibilities for radar and communication systems, and for the field of precision frequency metrology.

In one embodiment, the optical intensity of the beam is selected to provide gain to the modulated signal. In another embodiment, the optoelectronic filter further includes a signal level control circuit having an input adapted to couple to the respective one input of the optoelectronic filter and the first one of the modulator circuit inputs. The signal level control circuit is configured to receive the first and second RF signals, attenuate or amplify the first power level of the first RF signal and/or the second power level of the second RF signal, and provide an appropriately level adjusted (e.g. attenuated or amplified) signal to the first one of the modulator circuit inputs. In one embodiment, the signal level control circuit attenuates the power levels of one of the first or second signals using a respective plurality of attenuation factors.

In another embodiment, the optoelectronic filter further includes a signal level control circuit having an input adapted to couple to the modulator circuit output. The signal level control circuit is configured to receive the modulated signal, appropriately level adjust one or more respective portions of the modulated signal representative of the first power level of the first RF signal and/or the second power level of the second RF signal such that the first RF signal is further suppressed relative to the second RF signal, and provide an attenuated signal at an output thereof.

In one embodiment, the optoelectronic filter additionally includes a detector circuit having an input coupled to the modulator circuit output. The detector circuit is configured to receive the modulated signal at the input thereof and to provide a detected signal at an output thereof. In one embodiment, phase noise of the first RF signal is substantially suppressed from the modulated signal. In one embodiment, a ratio of the first RF signal level to a voltage level required to transition the first RF signal from constructive to destructive interference in said modulator circuit is given by $\pi v_1/V_\pi$, where $v_1$ is the first power level and $V_\pi$ is the voltage level. In one embodiment, the ratio produces an interference pattern having a generally sinusoidal shape. In one embodiment, the ratio is in the range of about 3.7 to about 3.9, the first RF signal is substantially suppressed and the second RF signal is proximate a local maximum. In one embodiment, the ratio is about 3.83 the transmission characteristic of the first RF signal from the respective input of the optoelectronic filter to a respective output of the optoelectronic filter is about zero and the transmission characteristic of the second RF signal from the respective input of the optoelectronic filter to the respective output of the optoelectronic filter is proximate a local maximum.

In one embodiment, the modulator circuit is provided as a Mach-Zehnder modulator. In other embodiments, other types of modulator circuits may be used.

In some embodiments, the light source is provided as any of: a photodiode, a light emitting diode (LED), and/or a laser diode. It should, however, be appreciated that other types of light sources may be used and one of ordinary skill in the art will appreciate how to select a light source for use in a particular application.

The optoelectronic filter described herein differs from conventional microwave-photonic (MWP) filters as it exploits nonlinearity rather than linear finite impulse response (FIR) or infinite impulse response (IIR) filtering techniques. The nonlinear optoelectronic filter has the configuration of a traditional MWP link (e.g. comprising a laser having an output intensity modulated by a modulator—e.g. a Mach-Zehnder modulator/interferometer) and subsequently detected by a detector (e.g. in one example embodiment, a photodetector). The RF input voltage applied to the modulator varies the refractive index of the electro-optic material embedded within the modulator. The modulator converts this linear change in refractive index into a precise sinusoidal variation in the optical intensity. The stored RF information is recovered upon detection of the optical envelope. It had been discovered that under certain ranges of applied RF voltage, this MWP link exhibits properties similar to a filter, but with functionality unachievable by ordinary filters. When two signals, one strong and one weak, are passed through the optoelectronic filter, the filter acts to suppress the stronger signal relative to the weaker signal, independent of their separation in frequency. The nonlinearity of the system also results in an additional third-order intermodulation product at the filter output which may be filtered with an additional filter (including, but not limited to a conventional all-electronic filter), if desired.

In another aspect, a method of filtering received signals in an optoelectronic filter includes receiving first and second radio frequency (RF) signals at an input of the optoelectronic filter, wherein the first RF signal is provided having a first power level and the second RF signal is provided having a second, lower power level. The method additionally includes attenuating the first power level of the first RF signal and/or the second power level of the second RF signal to produce an attenuated signal. The method also includes generating a modulated signal from the attenuated signal at an output of a modulator circuit, wherein the first RF signal is suppressed relative to the second RF signal in the modulated signal.

In another aspect, in a communication system, a receiver coupled to receive first and second radio frequency (RF) signals from one or more remote locations, wherein the first RF signal is provided having a first power level and the second RF signal is provided having a second, lower power level includes an optoelectronic filter having at least one input and an output. In one embodiment, the optoelectronic filter includes a modulator circuit having at least first and second inputs with a first one of the modulator circuit inputs adapted to couple to a respective one of the at least one input of the optoelectronic filter. The modulator circuit is configured to receive at least the first and second RF signals at the first one of the modulator circuit inputs and in response thereto said modulator circuit generates a modulated signal at an output thereof. The first RF signal is suppressed relative to the second RF signal in the modulated signal. The optoelectronic filter additionally includes a light source adapted to couple to a second one of the modulator circuit inputs. The light source configured to provide a beam having an optical intensity to the second one of the modulator circuit inputs.

In one embodiment, the optical intensity of the beam is selected to provide gain to the modulated signal. In another embodiment, the optoelectronic filter further includes a signal level control circuit having an input adapted to couple to the respective one input of the optoelectronic filter and the first one of the modulator circuit inputs. The signal level control circuit is configured to receive the first and second RF signals, level adjust the power level of the first RF signal and/or the power level of the second RF signal, and provide a level adjusted signal (e.g. either an attenuated or amplified signal) to the first one of the modulator circuit inputs as the first and second RF signals. In one embodiment, the signal level control circuit attenuates the first power level and/or the second power level using a respective plurality of attenuation factors. In some embodiments, the signal level control circuit may amplify (i.e. provide gain) to signals provided thereto. As will become apparent from the description provided hereinbelow, the purpose of the signal level control circuit is to achieve a ratio of $\pi v_1/v_\pi$ which ideally, is equal to a value of 3.83.

In one embodiment, the optoelectronic filter further includes a signal level control circuit having an input adapted to couple to the modulator circuit output. In one embodiment, the signal level control circuit is configured to receive the modulated signal, attenuate one or more respective portions of the modulated signal representative of the power level of the first RF signal and/or the power level of the second RF signal such that the first RF signal is further suppressed relative to the second RF signal, and provide an attenuated signal at an output thereof. In one embodiment, the optoelectronic filter further includes a detector circuit having an input coupled to the modulator circuit output. The detector circuit is configured to receive the modulated signal at the input thereof and to provide a detected signal at an output thereof.

With the above arrangement, an optoelectronic filter which acts to suppress a stronger RF signal in the presence of a weaker RF signal independent of their separation in frequency is provided. The capabilities of the optoelectronic filter thus break the conventional limits of signal detection, opening up new possibilities for many systems.

The optoelectronic filter and techniques described herein find use in a wide variety of applications including, but not limited to, radar systems, communication systems, metrology systems and the like. For example, an optoelectronic filter having the characteristics described herein is suitable for use in radar systems by allowing comparatively weaker signals to be detected over the phase noise of a relatively strong background signal. Also, an optoelectronic filter having the characteristics described herein is suitable for use in communication systems by allowing for more efficient use of a spectral bandwidth. More efficient use of a spectral bandwidth can be achieved by "stacking" different channels (i.e., transmitting multiple channels over a single carrier frequency or over multiple closely spaced carrier frequencies) and selectively tuning the filter to arrange a pass band on a desired channel (or "pick out" a desired channel). In some applications, the modulated information of multiple channels can overlap with one another. Thus, the filter circuit and techniques described herein enable efficient use of a spectral bandwidth since using the filter circuit and techniques described herein it is possible to suppress one channel's information relative to another channel independent of their separation in frequency. In this way, one can stack many channels close to each other (i.e. in close proximity in the frequency domain—for example, within less than several Hertz in the frequency domain) and transmit the information and still be able to recover the information in a receiving system which utilizes the nonlinear optoelectronic filter circuit and techniques described herein. Finally, the optoelectronic filter described herein may enhance the capabilities of metrology systems improving limits of signal detection, particularly in cases where detection is limited by a large signal interferer.

The asymmetric transmission for the individual signals through the nonlinear optoelectronic filter allow for unique capabilities in the control of electrical signal behavior. It has been demonstrated that by operating at the transmission null, a stronger input and its corresponding phase fluctuations or frequency modulation can be selectively suppressed relative to a weaker input. This suppression is independent of the frequency separation between the stronger and weaker signals and is not limited by the propagation time through a filter resonance. Furthermore, the optoelectronic filter can even provide net gain given sufficient optical power from the laser. These properties are especially useful in radar and precision metrology applications for detecting minute traces of a desired target over a large interferer signal. In communication systems, the ability to selectively suppress a modulated channel would allow for information packing at greater densities and gives rise to the possibility of sending hidden signals detectable only by the optoelectronic filter.

The simplicity of the scheme makes the optoelectronic filter amenable to photonic integration. Automatic gain control can be employed to lock the stronger input to its transmission null. In addition, techniques of sampling and digital signal processing or RF downconversion and analog filtering can be employed to remove unwanted intermodulation products. It should be noted that because the modulator $V_\pi$ varies slightly with frequency, the condition $\pi v_1/V_\pi=3.83$ becomes more difficult to maintain when the modulation sidebands become too far separated from the center. In these cases, the suppression of the sidebands becomes reduced. However, these issues can be mitigated through the use of modulators having wider bandwidth. The additional functionality provided by the nonlinear optoelectronic filter over conventional filters significantly enhances the ability of systems to detect weak signals.

BRIEF DESCRIPTION OF THE DRAWINGS

Features and advantages of the concepts, systems and techniques disclosed herein will be apparent from the following description of the embodiments taken in conjunction with the accompanying drawings in which:

FIG. 1A is a plot of a relatively weak signal embedded within the noise of a comparatively stronger signal;

DETAILED DESCRIPTION

Figure 1:
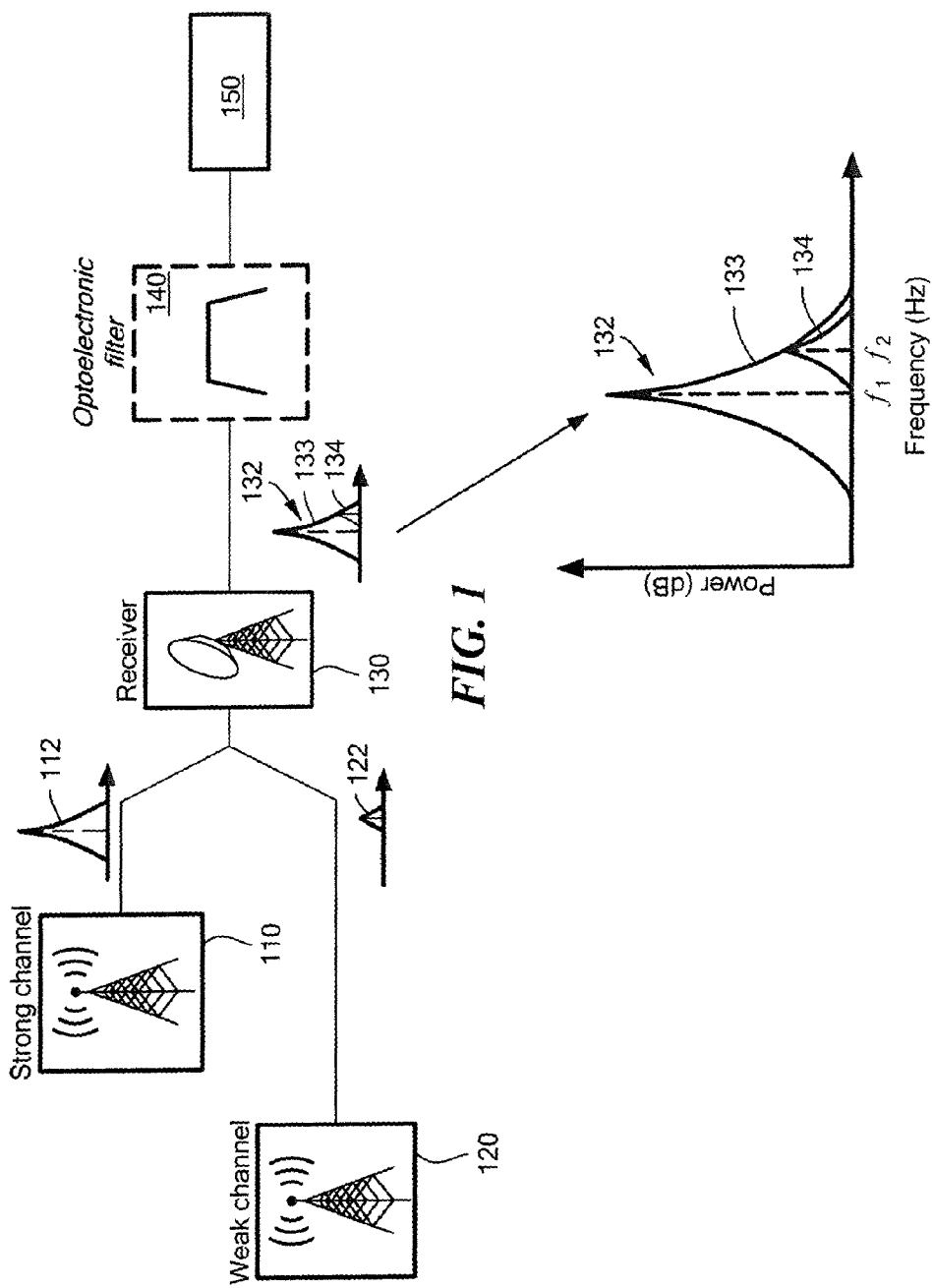
FIG. 1 is a block diagram of an example receiving system having an optoelectronic filter.

The features and other details of the concepts, systems, circuits and techniques sought to be protected herein will now be more particularly described. It will be understood that any specific embodiments described herein are shown by way of illustration and not as limitations of the disclosure. The principal features of this disclosure can be employed in various embodiments without departing from the scope of the concepts sought to be protected. Embodiments of the present disclosure and associated advantages may be best understood by referring to the drawings, where like numerals are used for like and corresponding parts throughout the various views.

Definitions

For convenience, certain introductory concepts and terms used in the specification are collected here.

As used herein, the term "noise" is generally used to describe unintended, and/or undesirable signals or fluctuations in signals that can obscure or hinder the detection of one or more signals of interest. The characteristics of the noise, including its frequency content (e.g. frequency, broadband, etc. . . . ), its intensity range, and its temporal nature (constant versus intermittent) can individually or collectively affect the detection of the signals of interest. Phase noise is the result of small, random fluctuations or uncertainty in the phase of a signal. Frequency errors inherently present in imperfect oscillators can contribute to phase noise.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied, for example, in a specially programmed microprocessor, a digital signal processor (DSP), or an application specific integrated circuit (ASIC), which can be an analog ASIC or a digital ASIC.

Additionally, in some embodiments the "processor" can be embodied in configurable hardware such as field programmable gate arrays (FPGAs) or programmable logic arrays (PLAs). In some embodiments, the "processor" can also be embodied in a microprocessor with associated program memory. Furthermore, in some embodiments the "processor" can be embodied in a discrete electronic circuit, which can be an analog or digital.

Referring now to FIG. 1, an example receiving system in accordance with the concepts, systems, circuits and techniques sought to be protected herein includes receiver circuitry 130 coupled to a nonlinear optoelectronic filter 140 as shown. ***In the example embodiment shown, the receiver system, which may be a receiver system in a communication system, is coupled to receive first and second radio frequency (RF) signals (e.g., via free space, optical fiber or another transmission medium) at one or more inputs thereof. The signals received by the receiver circuitry 130 may originate from one or more remote locations. A first one of the RF signals received by receiver circuitry 130 corresponds to a stronger signal 112 having a first power level and a second one of the RF signals received by receiver circuitry 130 corresponds to a weaker signal 122 having a second power level which is lower than the power level of the signal 112. The stronger signal 112 and/or the weaker signal 122 are, for example, received from first and second communication channels 110, 120, respectively. It should, of course, be appreciated that the system described herein may operate with any number of signals having different power levels (e.g. multiple weaker signals) without limit. A single weaker signal is discussed herein to promote simplicity, clarity and understanding in the description of the concepts, circuits, systems and techniques sought to be protected herein and is not intended to be, and should not be construed, as limiting.

In one embodiment, the stronger signal 112 is inherently stronger than the weaker signal 122. In another embodiment, the stronger signal 112 is stronger due to favorable transmission characteristics of the first communication channel 110 with respect to the receiver system in comparison to the second communication channel 120 with respect to the receiver system. Many reasons/scenarios may exist as to why one signal is stronger than another. For example, the first communication channel 110 may have a more favorable line-of-sight propagation and/or a higher rated power than the second communication channel 120, resulting in the first one of the input signals being received by the receiver system as the stronger signal 112. In such instances, the first communication channel 110 is representative of a first, stronger communication channel and the second communication channel is representative of a second, weaker communication channel.

In the example embodiment shown, in response to the RF signals 112, 122 provided thereto, the receiver circuitry 130 generates a combined signal 132 comprising the stronger signal (here, 133) and the weaker signal (here, 134) at an output thereof. In such an embodiment (and as most clearly shown in FIG. 1A), the weaker signal 134 is masked (or buried) beneath noise (including phase noise) of the stronger signal 133.

The weaker signal 134 is not detectable via conventional all-electronic filtering systems and techniques at least because the bandwidth of the pass band in such a conventional filter is insufficiently narrow to separate the stronger signal from the weaker signal. Furthermore, conventional filtering techniques cannot distinguish noise from the underlying signal. The foregoing may be found undesirable, for example, in instances where the weaker signal 134 is a "signal of interest" and the stronger signal 133 is unwanted noise (e.g., background noise).

However, in accordance with the concepts, systems, circuits and techniques sought to be protected herein, the optoelectronic filter 140, which is described in further detail in subsequent figures, is operable to receive and modulate the combined signal 132 such that the stronger signal 133 is substantially suppressed or even eliminated relative to the weaker signal 134 in a modulated signal generated at an output of the optoelectronic filter 140. This allows the weaker signal 134 to be recognized, received, and processed by circuitry 150 coupled to the optoelectronic filter output.

Referring now to FIG. 1A, an example plot of power vs. frequency illustrating the combined signal 132 described above in conjunction with FIG. 1 has a horizontal axis with a scale in frequency units of hertz (Hz) and a vertical axis with a scale in normalized power units of decibels (dB). As illustrated in FIG. 1A and described above, the weaker signal 134 is masked by (or "buried beneath") noise (including phase noise) associated with the stronger signal 133 in the combined signal 132 (e.g., as would be received at an input of the optoelectronic filter in FIG. 1). It is to be appreciated that although units are shown in FIG. 1A, FIG. 1A is used for illustration purposes and may not be drawn to scale.

Figure 2:
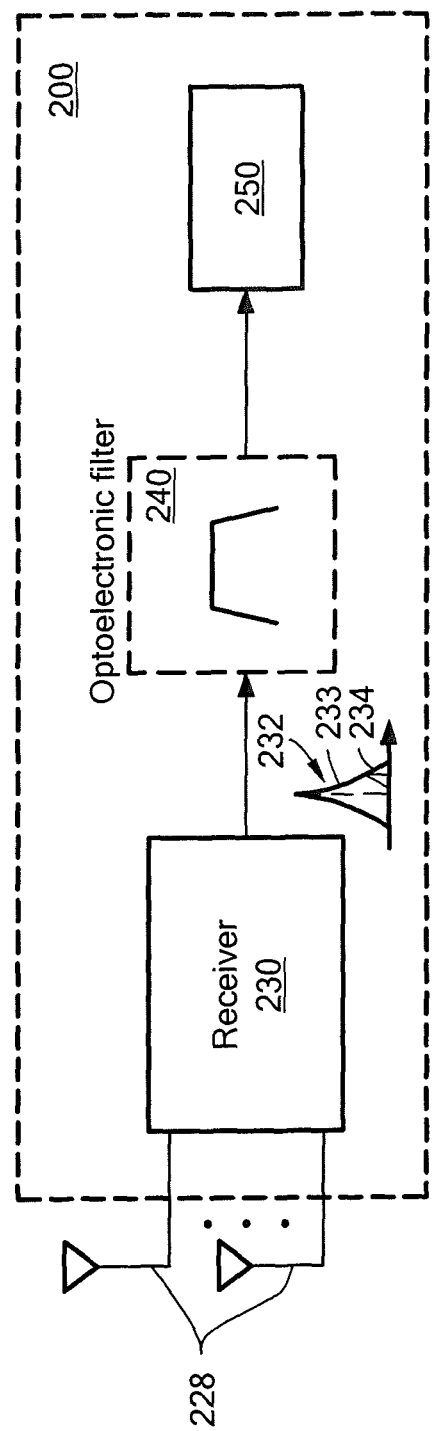
FIG. 2 is a block diagram of another example receiving system having an optoelectronic filter.

Referring now to FIG. 2, another example receiver system 200 in accordance with the concepts, systems, circuits and techniques sought to be protected herein includes receiver circuitry 230 and a nonlinear optoelectronic filter 240 coupled as shown. Similar to optoelectronic filter 140, optoelectronic filter 240 is capable of resolving a weaker signal beneath the phase noise of a stronger signal for reasons to be discussed. The receiver system 200, which may be a receiver system in a mobile communication system, for example, has an input adapted to couple to one or more transducers 228. In the example embodiment shown, the transducers 228 include a plurality of antennas, such as those typically found in multiple-input multiple-output (MIMO) systems.

The transducer 228 is coupled to receive first and second radio frequency (RF) signals from one or more remote locations (e.g., from free space or another transmission medium) at inputs thereof with a first one of the input signals corresponding to a stronger signal having a first power level and a second one of the input signals corresponding to a weaker signal having a second, lower power level. In one embodiment, the stronger and weaker input signals of FIG. 2 are the same as or similar to stronger and weaker signals 112, 122 of FIG. 1. The transducer 228, in response to receiving the stronger and weaker signals, provides the stronger and weaker signals to the receiver system input.

The receiver circuitry 230, which may include a processor and may be the same as or similar to receiver circuitry 130 of FIG. 1, has an input adapted to couple the receiver system input. In the example embodiment shown, the receiver circuitry 230 receives the stronger and weaker signals and in response thereto generates a combined signal 232, which may be the same as or similar to combined signal 132 of FIG. 1, at an output thereof. As illustrated, combined signal 232, like combined signal 132, comprises a stronger signal (here, 233) and a weaker signal (here, 234) with the weaker signal 234 buried beneath phase noise of the stronger signal 233. In another embodiment, the receiver circuitry 230 receives the stronger and weaker signals 233, 234 and in response thereto generates first and second receiver signals representative of the stronger and weaker signals 233, 234 at the output thereof.

The optoelectronic filter 240, which may be the same as or similar to the optoelectronic filter 140 of FIG. 1 and the optoelectronic filter 340 of FIG. 3, as will be discussed, has an input adapted to couple to the receiver circuitry output. In the example embodiment shown, the optoelectronic filter 240 receives the combined signal 232 at the input thereof and in response thereto generates a modulated signal at an output thereof. In another embodiment, the optoelectronic filter 240 receives the stronger and weaker signals 233, 234 at the input thereof and in response thereto generates a modulated signal at the output thereof. In either of the above embodiments, the stronger signal 233 is substantially suppressed (or ideally eliminated) relative to the weaker signal 234 in the modulated signal. In one embodiment, the optoelectronic filter 240, having an output adapted to couple to an output of the receiver system 200, provides the modulated signal to the receiver system output.

The circuitry 250, which may comprise digital signal processing (DSP) circuitry in one embodiment, has an input adapted to couple to the receiver system output. In the example embodiment shown, the circuitry 250 receives the modulated signal at the input thereof and in response thereto generates an appropriately processed signal at an output thereof. The appropriately processed signal may, for example, be received by subsequent circuitry in the receiver system 200 (e.g., display in mobile communication system).

Additional aspects of the concepts, systems, circuits and techniques described herein, with particular focus on optoelectronic filters, will be apparent from the subsequent figures.

Figure 3:
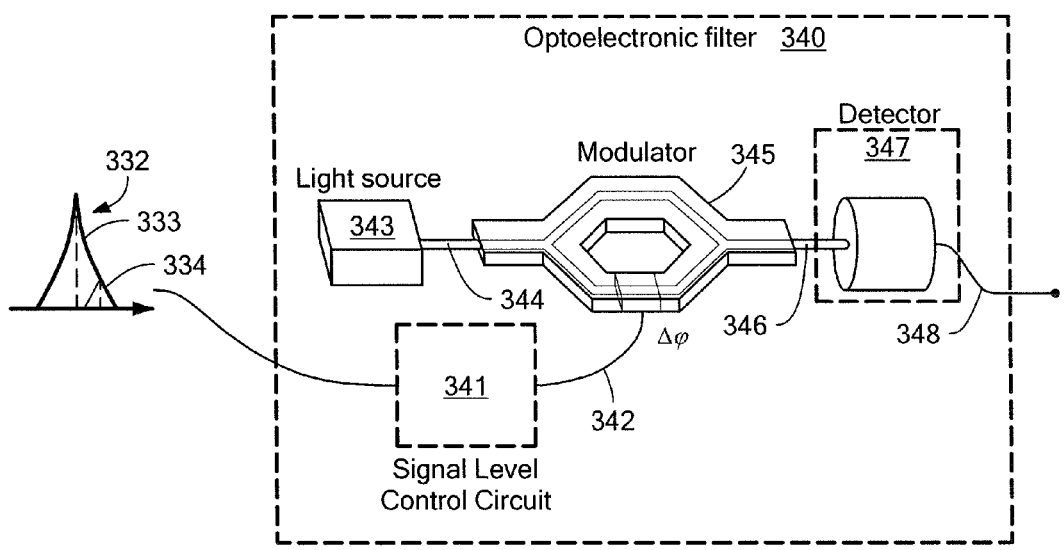
FIG. 3 is a block diagram of an example optoelectronic filter.

Referring now to FIG. 3, an example optoelectronic filter 340 of the type which may be the same as or similar to the optoelectronic filter 140 of FIG. 1 and/or the optoelectronic filter 240 of FIG. 2, and which may have a configuration similar to that of a traditional microwave-photonic (MWP) link, includes a light source 343 and a modulator circuit 345 coupled as shown. The optoelectronic filter 340 may also include a signal level control circuit 341 and a detector circuit 347 coupled as shown or in other functionally similar arrangements, as will be apparent. In the example embodiment shown, the signal level control circuit 341 and the detector circuit 347 are not properly a part of the optoelectronic filter 340 and are thus shown in phantom. In some applications, one or both of the signal level control circuit and detector circuit may be provided as part of the filter 340 and in other embodiments, one or both of the signal level control circuit and detector circuit maybe external to the filter 340.

The optoelectronic filter 340, which has at least one input and an output, is coupled to receive one or more input signals (generally denoted 332 in FIG. 3) at an input thereof. In one embodiment, the input signals 332 are received from receiver circuitry, which may be the same as or similar to receiver circuitry 130 of FIG. 1 and/or receiver circuitry 230 of FIG. 2. In another embodiment, the input signals 332 are received from one or more communication channels (e.g., communication channels 110 and/or 120 of FIG. 1).

In the example embodiment shown, the input signals 332 are provided as the same as or similar to the combined signal 132 of FIG. 1A and/or the combined signal 232 of FIG. 2. The input signals 332 comprise first and second RF signals with a first one of the RF signals corresponding to a stronger signal (here, 333) having a first power level and a second one of the RF signals corresponding to a weaker signal (here, 334) having a second, lower power level. As illustrated, the weaker signal 334 is buried beneath phase noise of the stronger signal 333. For at least the reasons discussed above, the weaker signal 334 is not detectable via conventional all-electronic filtering systems and techniques.

In another embodiment, the input signals 332 are provided as the same as or similar to input signals 112 and 122 of FIG. 1A, with a first one of the signals corresponding to a stronger signal having a first power level and a second one of the signals corresponding to a weaker signal having a second, lower power level. In such embodiment, the input signals 332 may, for example, be combinable in the optoelectronic filter 340 and/or in circuitry (e.g., combiner circuitry) exterior to the optoelectronic filter 340 to form a signal the same as or similar to the combined signal 132 of FIG. 1A and/or the combined signal 232 of FIG. 2 with the signal comprising a stronger signal (here, 333) having a first power level and a weaker signal (here, 334) having a second, lower power level.

In one embodiment, the stronger and weaker signals of input signals 332 are provided as time-varying RF signals which can, for example, be represented by $v_1 \sin(\omega_1 t)$ and $v_2 \sin(\omega_2 t)$, respectively, where $v_1$ and $\omega_1$ are the amplitude (i.e., voltage level) and frequency of the stronger signal and $v_2$ and $\omega_2$ are the amplitude (i.e., voltage level) and frequency of the weaker signal.

The signal level control circuit 341, having an input adapted to couple to the optoelectronic filter input, receives the input signals 332 at the input thereof. In response thereto, the signal amplitude attenuator circuit 341 generates an appropriately level adjusted input signal 342 at an output thereof. In one embodiment, in generating the input signal 342, the signal level control circuit 341 attenuates the stronger signal and/or the weaker signal such that the relative phase noise of the stronger signal is reduced with respect to the weaker signal. The level control circuit functions to ensure the stronger input amplitude is operated at the condition so that the stronger signal and its phase noise is suppressed relative to the weaker signals. In one embodiment, the signal level control circuit 341 appropriately level adjusts the first power level and/or the second, power level using a respective plurality of attenuation and/or gain factors.

The modulator circuit 345, which according to one embodiment is provided as a Mach-Zehnder modulator, has at least first and second inputs with a first one of the modulator circuit inputs adapted to couple to a respective one of the at least one input of the optoelectronic filter 340. In the example embodiment shown, the first one of the modulator circuit inputs is coupled to the signal level control circuit output with the signal level control circuit 341 having an input coupled to the respective one of the at least one input of the optoelectronic filter 340. A second one of the modulator circuit inputs is adapted to couple to an output of the light source 343. In one embodiment, the second modulator input is coupled to the light source output via an optical fiber or another optical transmission medium with a light beam 344 emitted by the light source 343 traveling along the optical fiber (or other optical transmission medium) to the second modulator input.

Coupling of an output of a light source (e.g., light source 343) to an input of a modulator circuit (e.g., modulator circuit 345) is conventional in the art and, therefore, is not described in detail herein.

In one embodiment, the light source 343 is provided as one or more of a light emitting diode (LED), or laser diode.

The modulator circuit 345 receives the appropriately level controlled input signal 342 and the light beam 344, which has an optical intensity, at the first and second inputs, respectively. In response thereto, the modulator circuit 345 generates a modulated signal 346 at an output thereof with the stronger signal 333 being substantially suppressed or even eliminated relative to the weaker signal 334 in the modulated signal 346. In one embodiment, the modulated signal 346 is generated upon detection of an optical envelope of the attenuated input signal 342 and the light beam 344 propagating through the modulator circuit 345. The light beam 344 may, for example, be intensity modulated in response to an applied voltage source and/or the attenuated input signal 342 such that by adjusting the applied voltage source the amplitude and/or phase of the modulated signal 346, and the suppression of the stronger signal 333 relative to the weaker signal 334 in the modulated signal 346, may be controlled. In one embodiment, the optical intensity of the light beam is selected to provide gain to the modulated signal 346. Additionally, the modulator circuit 345 can substantially suppress or even eliminate the stronger signal 333 relative to the weaker signal 334 in the modulated signal 346 by exploiting the transmission null of MWP links, as discussed further in conjunction with FIGS. 4-4B.

In one embodiment, the modulator circuit 345 is provided having an electro-optic material embedded within the modulator circuit 345. In one embodiment, the attenuated input signal 342, specifically the stronger and weaker signals of the attenuated input signal 342, is capable of varying the refractive index of this electro-optic material. The modulator circuit 345 can, for example, convert this change in the refractive index into a sinusoidal variation in optical intensity (or optical power P(t)) of the modulated signal 346 generated at the modulator circuit output. The optical power P(t) can, for example, be expressed as $$P(t) = \frac{P_0}{2}\left[1 + \sin\left(\frac{\pi}{V_\pi}v(t)\right)\right] \quad (1)$$

In which:
  $P_0$ is the optical power of the light source 343;
  $V_\pi$ is the voltage required to transition the stronger signal from constructive to destructive interference in the modulator circuit 345; and
  v(t) is a sum of the stronger and weaker signals.

In one embodiment, due to high linearity characteristics exhibited by the electro-optic effect, the variation in optical power P(t) as a function of input voltage (i.e., the sum of the stronger and weaker signals, v(t)) is substantially a perfect sinusoid.

The detector circuit 347, which according to some embodiments is provided as a photo-detector, has an input adapted to couple to the modulator circuit output. The detector circuit 347 receives the modulated signal 346 at the input thereof and in response thereto generates a detector signal 348 at an output thereof. The detector circuit 347 may, for example, sense light energy of the modulated signal 346 and generate the detector signal (e.g., photocurrent) 348 in response thereto. In one embodiment, the detector circuit 347 includes a load resistor R. In such embodiment, the detector signal 348 has a photodetected voltage V(t) which is given by the equation $$V(t) = P(t)\mathfrak{R}R \quad (2)$$

in which:
  P(t) is the optical power of the modulated signal 346;
  $\mathfrak{R}$ is a responsivity characteristic which is the ratio of the generated photodetector current to the incident optical power; and
  R is the resistance of the load resistor.

As will be shown in detail below, Equation (2) can be expanded into a series of Bessel functions from which the optoelectronic filter transmission can be evaluated for each of the individual inputs. In summary, however, the resulting transmission for each input exhibits saturation depending on the amplitudes of both $v_1$ and $v_2$, and significantly this behavior is asymmetric if $v_1 \neq v_2$.

The photodetected voltage V(t) can also be given by the equation $$V(t) = \frac{P_0 \mathfrak{R} R}{2}\left\{1 - \cos\left[\Gamma_0 + \frac{\pi}{V_\pi}(v_1\sin(\omega_1 t) + v_2\sin(\omega_2 t))\right]\right\} \quad (3)$$

in which

P$_0$, P(t), $\mathfrak{R}$, R, are as defined above;

$\Gamma_0$ is the modulator bias point of the modulator circuit 345;

V$_\pi$ is the voltage required to transition the strong signal from constructive to destructive interference in the modulator circuit (e.g. modulator circuit 345);

v$_1$ is the amplitude (i.e. voltage level), of the stronger signal;

$\omega_1$ is the radian frequency of the stronger signal;

v$_2$ is the amplitude of the weaker signal; and $\omega_2$ is the frequency of the weaker signal.

Equation (3), for example, allows for analysis of the photodetected voltage V(t) at an arbitrary point along the response curve of the modulated signal, which according to one embodiment is a sinusoidal modulation response.

Equations (2) and (3) can, for example, be expanded through a series of Bessel functions such that the photodetected voltage V(t) can be evaluated over a range of first and second RF signals which may be received at the input of the optoelectronic filter 340. Equation (3), for example, can be expanded through a series of Bessel functions as follows:

$$\cos\left[\Gamma_0 + \frac{\pi}{V_\pi}(v_1\sin(\omega_1 t) + v_2\sin(\omega_2 t))\right] = \qquad (4)$$

$$\sum_{n,m \geq 0} \begin{cases} \cos\Gamma_0 J_0\left(\frac{\pi v_1}{V_\pi}\right)J_0\left(\frac{\pi v_2}{V_\pi}\right) & n = m = 0 \\ (\pm 1)^n 2\cos\Gamma_0 J_n\left(\frac{\pi v_1}{V_\pi}\right)J_m\left(\frac{\pi v_2}{V_\pi}\right)\cos((n\omega_1 \pm m\omega_2)t) & n+m \text{ even} \\ -(\pm 1)^{n+1} 2\sin\Gamma_0 J_n\left(\frac{\pi v_1}{V_\pi}\right)J_m\left(\frac{\pi v_2}{V_\pi}\right)\sin((n\omega_1 \pm m\omega_2)t) & n+m \text{ odd} \end{cases}$$

where $\Gamma_0$, v$_1$, v$_2$, $\omega_1$, $\omega_2$, and V$_\pi$ retain the definitions set forth above.

The contributions of frequencies $\omega_1$, $\omega_2$ of the stronger signal and the weaker signal, respectively, to the photodetected voltage V(t) of the detector signal 348 can be determined from the following equation:

$$V(\omega_1 t) = P_0 \mathfrak{R} R\sin\Gamma_0 J_1\left(\frac{\pi v_1}{V_\pi}\right)J_0\left(\frac{\pi v_2}{V_\pi}\right)\sin(\omega_1 t) \qquad (5)$$

$$V(\omega_2 t) = P_0 \mathfrak{R} R\sin\Gamma_0 J_0\left(\frac{\pi v_1}{V_\pi}\right)J_1\left(\frac{\pi v_2}{V_\pi}\right)\sin(\omega_2 t)$$

corresponding to the cases of (n=1, m=0) and (n=0, m=1), respectively.

In one embodiment, the photodetected voltage V(t) of the detector signal 348 exhibits saturation depending on the amplitudes (i.e., the first and second, lower power levels) of the stronger and weaker signals and, as noted above, this behavior is asymmetric.

In the example embodiment shown, the detector signal 348 is received at the optoelectronic filter output. In another embodiment, the detector signal 348 may be received by an optoelectronic receiver capable of converting the detector signal 348 into an appropriate signal format (e.g., digital or analog signal) for the detector signal 348 to be received by subsequent circuitry (e.g., processing circuitry in a receiver system).

In another example embodiment, the signal level control circuit 341 may be provided having an input adapted to couple to the modulator circuit output and an output adapted to couple to the detector circuit input. In such embodiment, the modulator circuit 345 receives the input signals 332, or an associated signal, at the first modulator input and the signal level control circuit 341 attenuates the modulated signal 346 such that the power level of the weaker signal in the modulated signal 346 is attenuated.

In one embodiment, the filtering behavior of the optoelectronic filter 340 (i.e., the ability of the optoelectronic filter 340 to suppress the first, stronger RF signal relative to the second, weaker RF signal) described above is a consequence of asymmetry in the transmission and propagation of the first and second RF signals over the optoelectronic filter 340 as a result of the respective first and second power levels being different.

Figure 5:
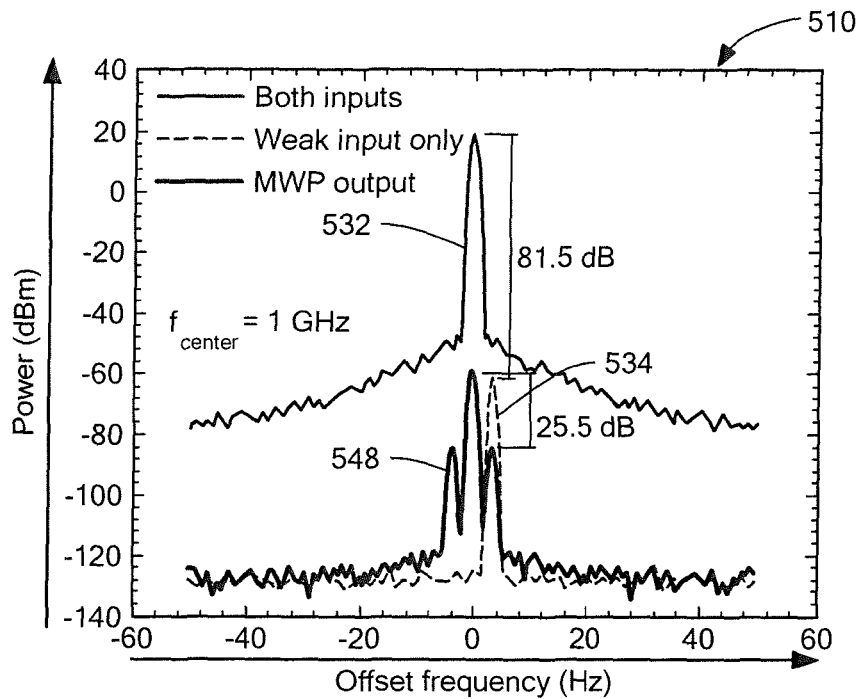
FIG. 5 is a plot of a signals measured at an input and output of an optoelectronic filter which is the same as or similar to the example optoelectronic filter of FIG. 3.
Figure 5A:
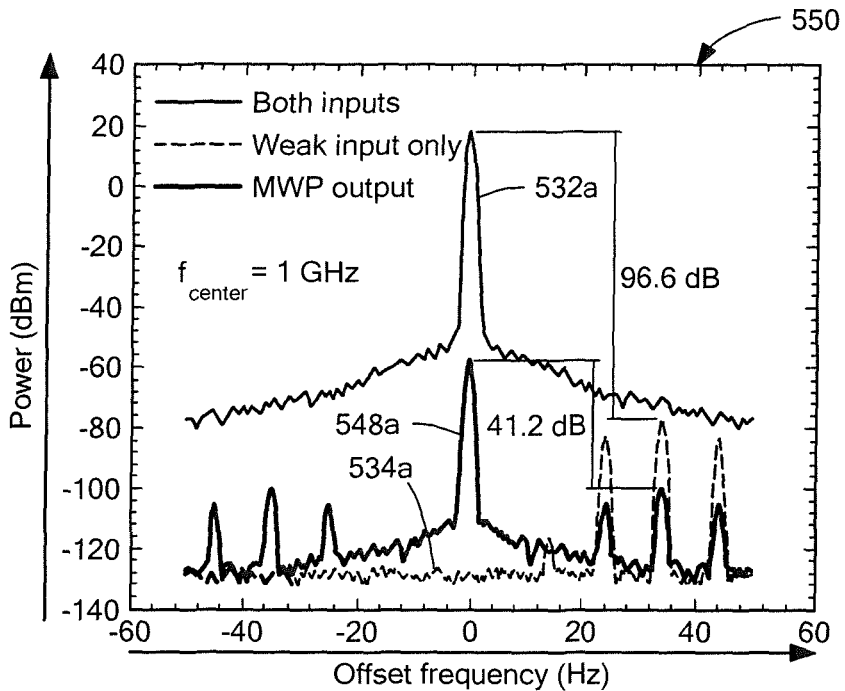
FIG. 5A is another plot of a signals measured at an input and output of an optoelectronic filter which is the same as or similar to the example optoelectronic filter of FIG. 3.

Under other ranges of operation, however, the optoelectronic filter 340 exhibits filtering characteristics that are unachievable by conventional filters such as suppressing the first RF signal relative to the second RF signal independent of the separation in frequency between the first and second RF signals (e.g., as shown in FIGS. 5 and 5A).

Figure 4:
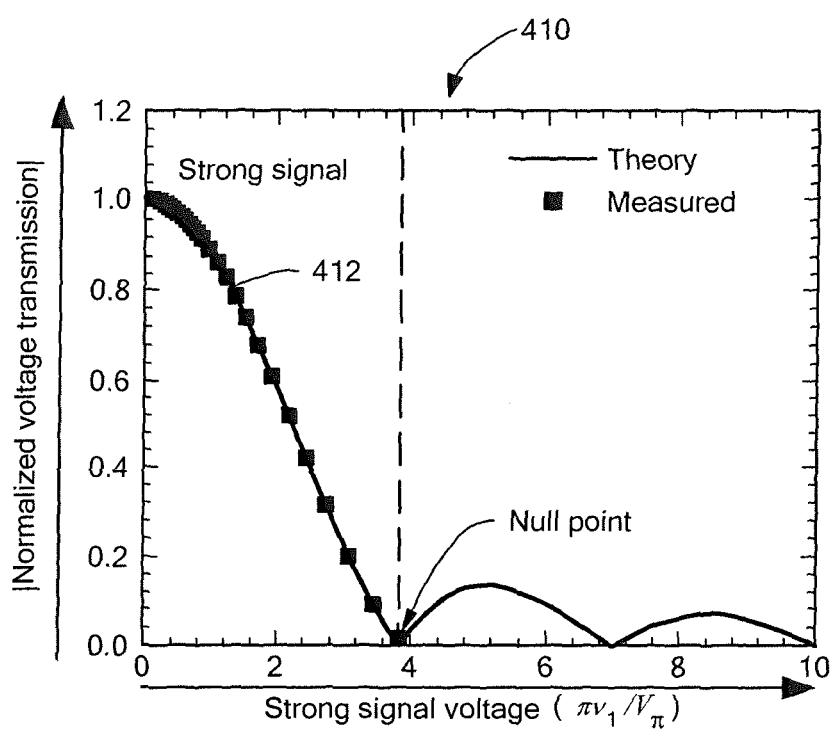
FIG. 4 is a plot of measured and theoretical magnitudes of the normalized voltage transmission for a comparatively stronger signal through an optoelectronic filter which is the same as or similar to the example optoelectronic filter of FIG. 3.
Figure 4A:
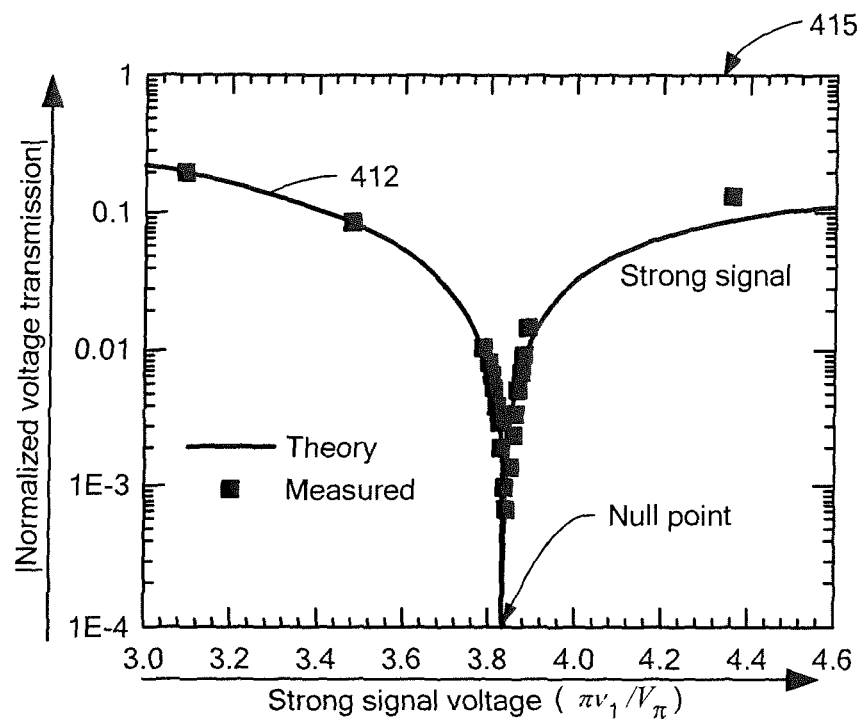
FIG. 4A is a plot of the voltage transmission for the stronger signal of FIG. 4 near a null transmission point of the stronger signal.
Figure 4B:
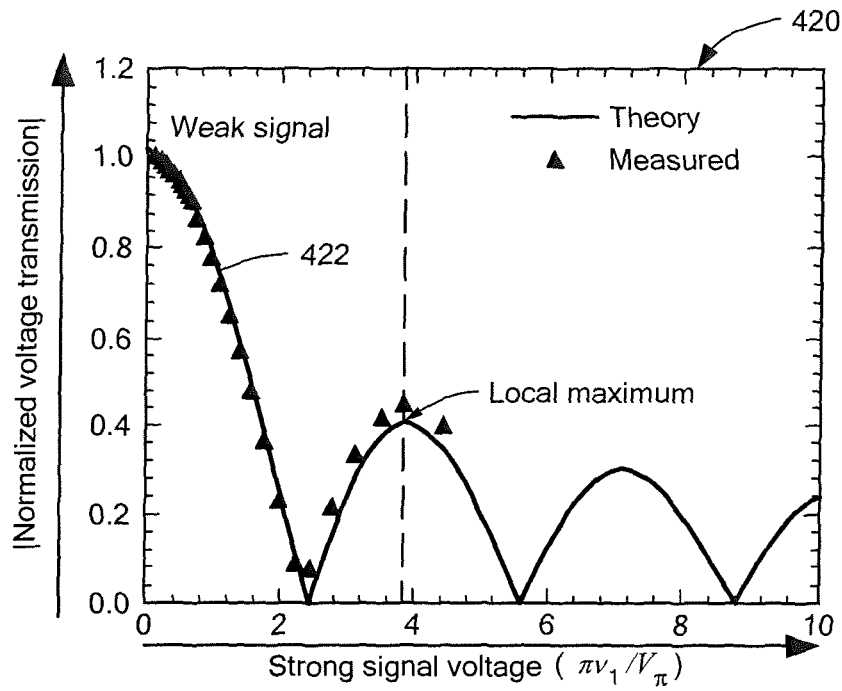
FIG. 4B is a plot of measured and theoretical magnitudes of the normalized voltage transmission for a relatively weak signal through an optoelectronic filter which is the same as or similar to the example optoelectronic filter of FIG. 3.

As illustrated in FIGS. 4-4B discussed below, assuming the case of a strong signal (v$_1$) and a weak signal (v$_2$), the magnitude of the voltage transmission for each input can be plotted as a function of v$_1$ to determine the saturation induced by the stronger input. In FIGS. 4-4B, the transmission characteristics are normalized to unity and v$_1$ is normalized to V$_\pi$ so that the plotted characteristics remain general across all operating conditions. The voltage transmissions are initially equal for both inputs at low v$_1$ but undergo different behaviors as the optoelectronic filter saturates. The transmission behaviors were also verified through measurement, as shown. It should be noted that at the point where $\pi v_1/V_\pi$=3.83 in FIG. 4, the theoretical transmission is identically zero for the stronger signal but reaches a local maximum for the weaker signal. The functionality of the optoelectronic filter depends critically on operating at this point. A finer scan around the point of zero transmission is shown in FIG. 4A, where measurements verify substantial nulling of the stronger signal. Although the optoelectronic filter behavior was specifically found assuming low levels of v$_2$, it is important to note that the nulling of the transmission for input signal 1 occurs regardless of the value of v$_2$ Referring now to FIG. 4, a plot 410 of normalized voltage transmission vs. strong signal voltage for measured and theoretical magnitudes of a stronger signal (e.g., stronger signal 333 of FIG. 3) through an optoelectronic filter (e.g., optoelectronic filter 340 of FIG. 3) has a horizontal axis with a scale in strong signal voltage units of ($\pi v_1/V_\pi$), where v$_1$ is the amplitude (i.e., power level) of the stronger signal and V$_\pi$ is the voltage required to transition the stronger signal from constructive to destructive interference in a modulator circuit (e.g., modulator circuit 345 of FIG. 3) of the optoelectronic filter. The plot also has a vertical axis with a scale in normalized voltage units where a maximum normalized voltage is achieved when the normalized voltage of the stronger signal received by the optoelectronic filter over the normalized voltage of the stronger signal in the modulated signal (e.g., modulated signal 345 of FIG. 3) is one. As noted above, in the plot shown, $v_1$ is normalized to $V_\pi$ such that the plotted characteristics shown in FIG. 4 remain substantially the same across a plurality of operating conditions of the optoelectronic filter. These operating conditions include but are not limited to, for example, changes in the modulator bias point, changes in optical power, and/or changes in modulator $V_\pi$. The normalized plot of FIG. 4 is true for any modulator exhibiting a sinusoidal interference pattern despite having different operating conditions.

Referring briefly to FIG. 4B, a plot 420 of normalized voltage transmission vs. strong signal voltage for measured and theoretical magnitudes of a weaker signal 422 (e.g., weaker signal 334 of FIG. 3) through an optoelectronic filter (e.g., optoelectronic filter 340 of FIG. 3) has the same vertical axis and horizontal axis as FIG. 4.

In the example embodiment shown, a ratio of the first power level of the stronger signal 412 of FIG. 4 to a voltage level required to transition the stronger signal 412 from constructive to destructive interference is given by $\pi v_1/V_\pi$, as indicated by the horizontal axis of FIGS. 4 and 4B. In one embodiment, when the ratio is in the range of about 3.7 to about 3.9, the stronger signal 412 is substantially suppressed relative to the weaker signal 422 of FIG. 4B in the modulated signal. In the example embodiment shown, when the ratio is about 3.83 the transmission characteristic of the stronger signal 412 from a respective input of the optoelectronic filter to a respective output of the optoelectronic filter is substantially zero (i.e., substantially zero transmission for the stronger signal), as denoted by the null point in FIG. 4. As illustrated in FIG. 4A, which is a substantially magnified plot 415 of the plot 410 of FIG. 4 having the same horizontal axis and vertical axis, a null point exists when the ratio is about 3.83. Additionally, in the example embodiment shown, when the ratio is about 3.83 the transmission characteristic of the weaker signal 422 from a respective input of the optoelectronic filter to a respect output of the optoelectronic filter is at a proximate maximum (i.e., a point of maximum transmission for the weaker signal), as denoted by the local maximum in FIG. 4B.

In accordance with the concepts, systems, circuits and techniques sought to be protected herein, operating the stronger signal 412 at the point of zero transmission (i.e., the null point) allows for unique capabilities in the control of RF signals. In the example embodiment shown in FIG. 3, for example, where the optoelectronic filter 340 receives input signals 332 comprising first and second RF signals with a first one of the RF signals corresponding to a stronger signal 333 having a first power level and a second one of the RF signals corresponding to a weaker signal 334 having a second, lower power level, when the stronger signal 333 is operating at the point of zero transmission, the stronger signal 333 can be selectively suppressed relative to the weaker signal 334 independent of their frequency separation. Moreover, the phase noise of the stronger signal 333 can be selectively suppressed relative to the weaker signal 334 regardless of the amplitude (i.e., power level) of the weaker signal. In one embodiment, the response characteristic of the optoelectronic filter (e.g., 340 of FIG. 3) is adjustable in near real-time (limited only by the speed of the modulator and detector) since its operation does not depend on a resonance effect, in contrast to conventional filters.

It is recognized that in some embodiments it is difficult for amplitude (i.e., power level) fluctuations of the stronger signal (e.g., 333 of FIG. 3) to be nulled relative to the weaker signal (e.g., 334 of FIG. 3) if the amplitude of the stronger signal wavers around the zero transmission point. However, since phase noise is generally many orders of magnitude larger than the amplitude noise in oscillators, the effects of the amplitude of the stronger signal wavering is substantially negligible.

As will be described in conjunction with FIGS. 5 and 5A, the properties of an optoelectronic filter manufactured and operating in accordance with the concepts described above were experimentally verified through measurements of its output electrical spectrum over a span of 100 Hz. In FIG. 5, the stronger signal was centered at 1 GHz, while the weaker signal is located at a frequency larger by 3.5 Hz. The two inputs were operated independently from one another. With both inputs on, the spectrum exhibits the appearance of a single input since the weaker signal is 81.5 dB below the peak of the stronger signal and >10 dB below its phase noise. If the stronger signal is turned off, the weaker signal becomes clearly visible.

It should be noted that conventional all-electronic filters cannot be used here as they lack both the narrow bandwidth and the ability to reject only the stronger input. However, upon passing both inputs through the nonlinear optoelectronic filter, the stronger signal is selectively suppressed by an additional 56 dB thus uncovering the presence of the weaker signal. A third-order intermodulation product is also visible on the other side of the spectrum. The total RF loss of the weaker signal was 22.7 dB here corresponding to operation at a photocurrent of ~4 mA. Since the optoelectronic filter has the dual functionality of a nonlinear filter and an electronic amplifier, net gain can be achieved passing through the filter given a large enough optical power.

FIG. 5A shows a similar measurement but with the weaker signal located 35 Hz away from the stronger signal and with a RF power that is 96.6 dB lower. The weaker signal is also amplitude modulated at a frequency of 10 Hz. The spectrum of both inputs again yields the appearance of the stronger input alone since the presence of the weaker signal is masked by phase noise. However, after passing both inputs through the optoelectronic filter, the stronger signal receives an additional 55.4 dB suppression revealing the underlying weaker signal and its modulation sidebands.

Turning now to FIG. 5, a plot 510 of power vs. frequency illustrating an example combined signal 532, a weak signal 534, and an output signal 548. Plot 510 has a horizontal axis with a scale in frequency units of hertz (Hz) and a vertical axis with a scale in power units of dBm measured at a frequency spectrum over a 100 Hz span. The combined signal 532, which may be the same as or similar to combined signal 332 of FIG. 3, comprises a stronger signal having a first power level and the weaker signal 534 having a second, lower power level. In the example embodiment shown, the stronger signal of the combined signal 532 has a center frequency of 1 gigahertz (GHz). The weaker signal 534 is offset by the stronger signal by 3.5 hertz (Hz).

As illustrated, the weaker signal 534 is buried beneath (here, 81.5 dB below) the noise of the stronger signal in the combined signal 532. After being received by and processed by an optoelectronic filter, which may be the same as or similar to optoelectronic filter 340 of FIG. 3, however, the stronger signal is substantially suppressed (here, selectively suppressed by an additional 56 dB) relative to the weaker signal 534 in the output signal 548. In the example embodiment shown, the weaker signal 534 becomes visible in the output signal 548 at a frequency 3.5 Hz offset from the stronger signal. As noted above, conventional all-electronic filters would not be suitable here as they lack both the narrow bandwidth and the ability to reject only the stronger input.

In the example embodiment shown, the optoelectronic filter is provided having the functionality of a nonlinear filter and of an electronic amplifier. In one embodiment, gain for the optoelectronic filter can be achieved by adjusting the optical intensity of the light beam (e.g., 344 of FIG. 3) generated by the light source (e.g., 343 of FIG. 3) of the optoelectronic filter.

Referring now to FIG. 5A, a plot 550 of power vs. frequency illustrating another example combined signal 532a, a weak signal 534a, and a modulated signal 548a has a horizontal axis with a scale in frequency units of hertz (Hz) and a vertical axis with a scale in power units of decibels (dB). In the example embodiment shown, the stronger signal of the combined signal 532a has a center frequency of 1 gigahertz (GHz). The weaker signal 534a is offset by the stronger signal by 35 Hz.

As illustrated, the weaker signal 534a is buried beneath (here, 96.6 dB below) the noise of the stronger signal in the combined signal 532a. Upon the weaker signal 534a of the combined signal 532a being amplitude modulated (here by 10 Hz) and processed by an optoelectronic filter, which may be the same as or similar to optoelectronic filter 340 of FIG. 3, however, the stronger signal and its corresponding phase noise is substantially suppressed (here, selectively suppressed by an additional 55.4 dB) relative to the weaker signal 534a in the output signal 548a. In one embodiment, the phase-noise suppression is a consequence of relatively small fluctuations in frequency of the stronger signal not changing the voltage amplitude of the stronger signal from operating the null point discussed above in conjunction with FIGS. 4-4B (e.g., $\pi v_1/V_\pi$ being about 3.83 in one embodiment).

The above discussion has highlighted the unique capabilities of an optoelectronic filter provided and operated in accordance with the concepts described herein, resulting in the selective suppression of a stronger input and its corresponding phase noise. The phase-noise suppression is a result of the fact that relatively small fluctuations in frequency do not change the voltage amplitude from operating at $\pi v_1/V_\pi=3.83$. It is next shown that the above-described properties also apply to the case of deterministic phase or frequency modulation. For two phase- or frequency-modulated inputs, one strong and one weak, applied to the optoelectronic filter, the operation of the filter acts to suppress the stronger signal and its modulation sidebands (e.g. see FIG. 6).

Figure 6:
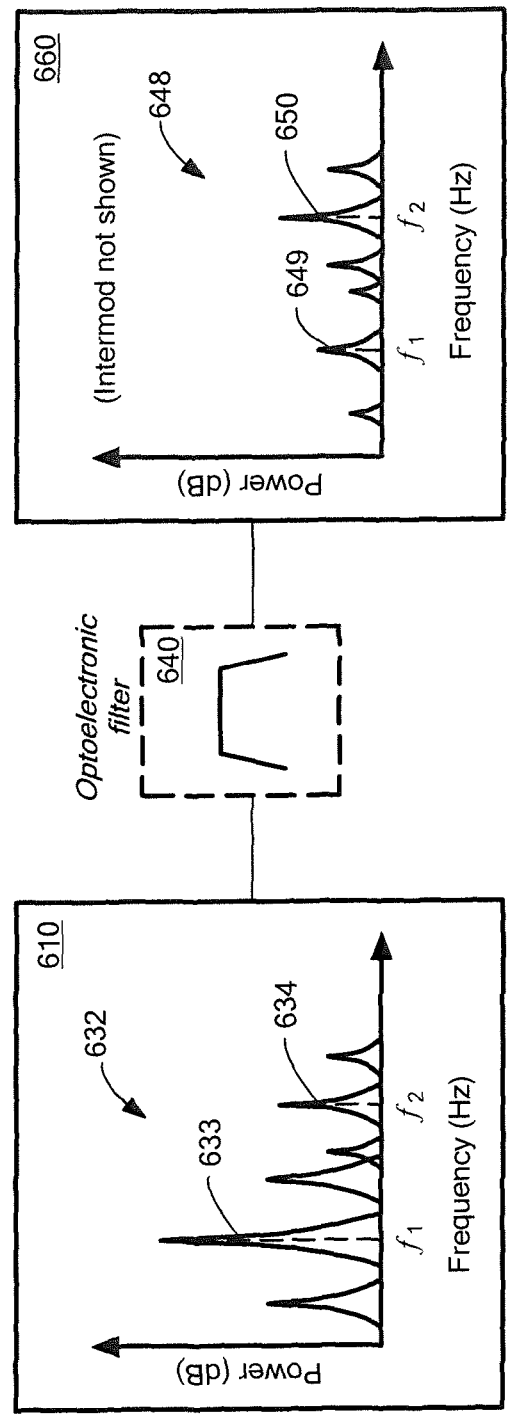
FIG. 6 is a plot of a power vs. frequency for stronger and weaker frequency modulated signals before and after passing through an optoelectronic filter.

Referring now to FIG. 6, a plot 610 of power vs. frequency illustrating a combined signal 632 is shown. Plot 610 has a horizontal axis with a scale in frequency units of hertz (Hz) and a vertical axis with a scale in normalized power units of decibels (dB) and a plot 660 of power vs. frequency illustrating a modulated signal 648 generated by an optoelectronic filter 640 has a horizontal axis with a scale in frequency units of hertz (Hz) and a vertical axis with a scale in normalized power units of decibels (dB). As shown, the combined signal 632 comprises a stronger signal 633 having a first power level and a weaker signal 634 having a second, lower power level. Additionally, there is a frequency difference between the stronger signal 633 and the weaker signal 634, with the stronger signal 633 having a center frequency of f1 and the weaker signal 634 having a center frequency of f2. The optoelectronic filter 640, which may be the same as or similar to optoelectronic filter 340 of FIG. 3, receives the combined signal 632 at an input thereof and generates the output signal 648 at an output thereof. In the example embodiment shown, the optoelectronic filter 640 attenuates the first power level of stronger signal 633 (e.g., through a signal level control circuit which is the same as or similar to signal level control circuit 341 of FIG. 3) and generates the output signal 648 such that the stronger signal 633 and its modulation sidebands are suppressed relative to the weaker signal 634. In embodiments in which the RF signal levels can be directly controlled, the signal level control circuit would not be required. In one embodiment, the spurious signals are a consequence of a third-order (e.g. $2f_1-f_2$) intermodulation product. It is to be appreciated that spurious signals, including spurious signals generated at intermodulation products of $f_1$, and $f_2$, can, for example, be further removed through conventional RF filtering (e.g. filtering through digital signal processing or just simply bandpass filtering.

Figure 7:
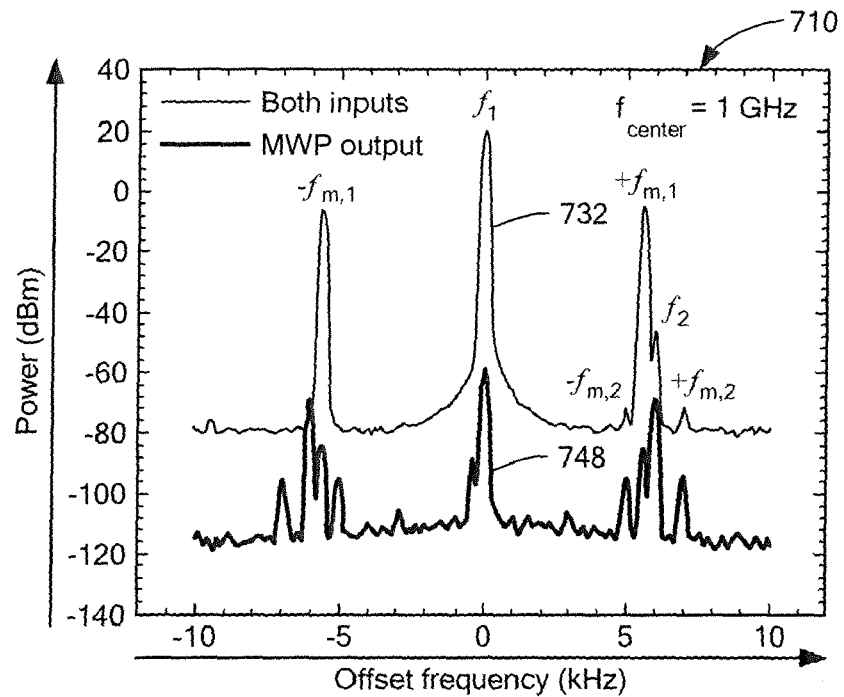
FIG. 7 is a plot of frequency modulated signals measured at an input and output of an optoelectronic filter which is the same as or similar to the example optoelectronic filter of FIG. 3.

Referring now to FIG. 7, a plot 710 of power vs. frequency illustrating an example combined signal 732 and an example output signal 748 at an input and output of an optoelectronic filter over a 20 kilohertz span, respectively, has a horizontal axis with a scale in frequency units of kilohertz (KHz) and a vertical axis with a scale in power units of dBm. In the example embodiment shown, the stronger signal of the combined signal 732 is located at a frequency of 1 GHz ($f_1$). Additionally, in the example embodiment shown the weaker signal of the combined signal 732 has a power level (i.e., second, lower power level) that is 66.4 dB lower and a frequency offset from that of the stronger signal by 6 kHz ($f_2$).

The weaker signal is frequency modulated at a rate of 1 kHz, generating spurs at a 7 kHz offset ($+f_{m,2}$) and a 5 kHz offset ($-f_{m,2}$). The stronger signal is frequency modulated at a rate of 5.6 kHz placing a large modulation sideband ($+f_{m,1}$) near the middle of the weaker signal, obstructing detection of the weaker signal. Upon sending both the combined signal 732 through the optoelectronic filter, which may be the same as or similar to optoelectronic filter 340 of FIG. 3, the stronger signal and its modulation sidebands decrease uncovering the weaker signal and its modulated information. As illustrated, the nonlinearities of the optoelectronic filter result in the generation of various spurious tones on the other side of the spectrum. However, as discussed above, these various spurious tones can be removed by additional filtering.

Figure 7A:
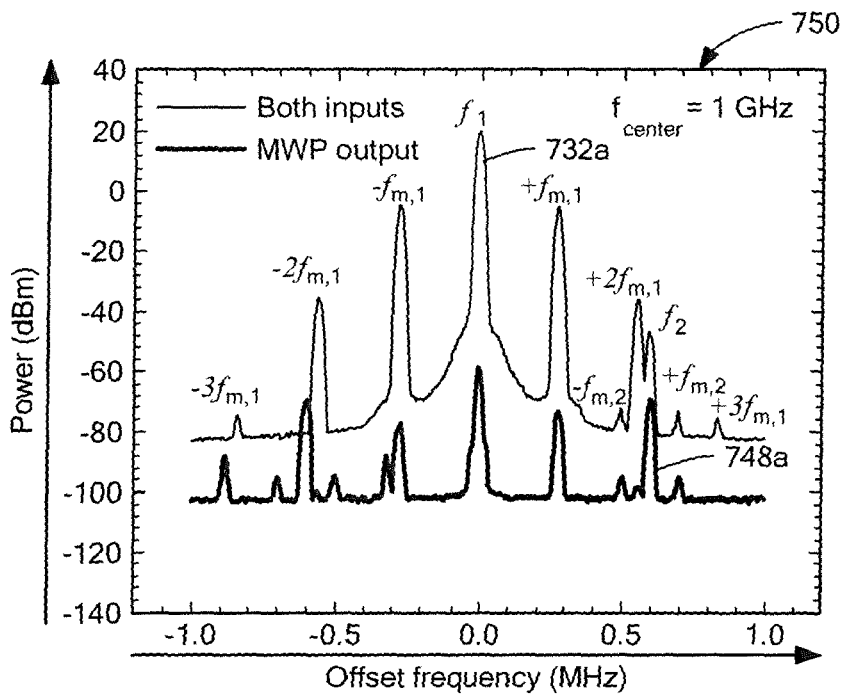
FIG. 7A is another plot of frequency modulated signals measured at an input and output of an optoelectronic filter which is the same as or similar to the example optoelectronic filter of FIG. 3.

Referring now to FIG. 7A, a plot 720 shows a similar measurement to that of FIG. 7 with a similar horizontal axis (here, MHz vs. kHz in FIG. 7) and same vertical axis to that of FIG. 7. Here, however, the combined signal 732a and modulated signal 748a are measured over a 2 MHz span with the second sideband of the stronger signal ($+2f_{m,1}$) initially blocking the detection of the weaker signal.

In the example embodiment shown, the weaker signal is located 66.5 dB below the stronger signal. The stronger signal remains centered at 1 GHz, while the weaker signal is offset in frequency by 600 kHz and frequency modulated at a rate of 100 kHz. The stronger signal is frequency modulated at a rate of 280 kHz, generating multiple sidebands ($\pm f_{m,1}$ through $\pm 3f_{m,1}$) within the 2 MHz span. The $+2f_{m,1}$ sideband is located near the center of the weaker signal, obstructing the ability to detect the modulated information of the weaker signal. However, after passing both inputs (i.e., the combined signal 732a) through the optoelectronic filter, which may be the same as or similar to the optoelectronic filter 340 of FIG. 3, only a small remnant of the $+2f_{m,1}$ sideband and the remaining modulation sidebands of the stronger signal are visible in the output signal 748a.

In one embodiment, the components of the optoelectronic filter comprised a JDS Uniphase CQF935 distributed feedback laser ($P_O$=20 mW), a 14 GHz EOSPACE intensity modulator ($V_\pi$=2.66 V at 1 GHz), and a 4.7 GHz Discovery Semiconductors DSC50 photodiode ($\Re$=0.77 A/W). Polarization paddles were used before the modulator for control of the input polarization, and two optical isolators were employed to prevent unwanted reflections, one after the laser and one before the photodetector.

In one embodiment, measurements were performed by modulating the laser power with an RF input consisting of two signals produced from independent RF frequency synthesizers. The RF power and frequency of each signal was controlled by setting each synthesizer with no additional locking required. The photodetected output of the optoelectronic filter was then sent through a DC block and into an Agilent E4440A spectrum analyzer for processing. By measuring the traces at both the input and output of the link, the transmission can be determined for both inputs. The spectrum measurement also captures the presence of nonlinear intermodulation products. A total of three RF sources were used to generate the desired signals transmitted through the optoelectronic filter. For the measurements that did not require frequency modulation, an Agilent E8241A signal generator served as the stronger input while a HP 8665B signal generator served as the weaker input. For the measurements employing frequency modulation, the HP 8665B signal generator with its internal modulation capabilities served as the stronger input amplified by a Mini-Circuits ZHL-42W RF amplifier. A HP 8340B signal generator served as the weaker input externally modulated by a Tektronix FG504 function generator.

Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

The invention claimed is:

1. An optoelectronic filter for suppressing at least a first radio frequency (RF) signal relative to a second RF signal, the first RF signal having a first power level and the second RF signal having a second, different power level than the first RF signal, the optoelectronic filter having at least one input configured to receive the first and second RF signals and an output, and the optoelectronic filter comprising:

a signal level control circuit having an input coupled to the at least one optoelectronic filter input, said signal level control circuit configured to: receive the first and second RF signals at the input thereof, adjust a power level of the first RF signal and/or the power level of the second RF signal, and in response thereto provide a level-adjusted signal at an output thereof;

a modulator circuit having at least first and second inputs with a first one of the modulator circuit inputs coupled to the signal level control circuit output, said modulator circuit configured to receive the level-adjusted signal at the first one of the modulator circuit inputs and in response thereto generate a modulated signal at an output thereof; and a light source coupled to a second one of the modulator circuit inputs, said light source configured to provide a beam having an optical intensity to the second one of the modulator circuit inputs, wherein the signal level control circuit adjusts the power level of the first RF signal and/or the power level of the second RF signal such that the first RF signal transitions from constructive to destructive interference in said modulator circuit, wherein the first RF signal is suppressed relative to the second RF signal in the modulated signal.

2. The optoelectronic filter of claim 1 wherein an optical intensity of the beam is selected to provide gain to the modulated signal.

3. The optoelectronic filter of claim 1 wherein said modulator circuit is configured to generate the modulated signal upon detection of an optical envelope of the level-adjusted signal and propagation of the beam through said modulator circuit.

4. The optoelectronic filter of claim 1 wherein the signal level control circuit adjusts the power level of the first RF signal and/or the power level of the second RF signal using a respective plurality of attenuation or gain factors.

5. The optoelectronic filter of claim 1 wherein the signal level control circuit also an input coupled to the modulator circuit output, said signal level control circuit configured to: receive the modulated signal at the input thereof, attenuate one or more respective portions of the modulated signal representative of the first power level of the first RF signal and/or the power level of the second RF signal such that the first RF signal is further suppressed relative to the second RF signal, and in response thereto provide an attenuated signal at an output thereof.

6. The optoelectronic filter of claim 1 further comprising:

a detector circuit having an input coupled to the modulator circuit output, said detector circuit configured to receive the modulated signal at the input thereof and to provide a detected signal at an output thereof.

7. The optoelectronic filter of claim 1 wherein phase noise of the first RF signal is substantially suppressed from the modulated signal.

8. The optoelectronic filter of claim 1 wherein a ratio of the power level of the first RF signal to a voltage level required to transition the first RF signal from constructive to destructive interference in said modulator circuit is given by $\pi v_1/V_\pi$, where $v_1$ is the power level of the first RF signal and $V_\pi$ is the voltage level.

9. The optoelectronic filter of claim 8 wherein the ratio produces an interference pattern having a generally sinusoidal shape.

10. The optoelectronic filter of claim 8 wherein when the ratio is in the range of about 3.7 to about 3.9, the first RF signal is substantially suppressed and the second RF signal is proximate a local maximum.

11. The optoelectronic filter of claim 8 wherein when the ratio is about 3.83 the transmission characteristic of the first RF signal from the respective input of the optoelectronic filter to a respective output of the optoelectronic filter is about zero and the transmission characteristic of the second RF signal from the respective input of the optoelectronic filter to the respective output of the optoelectronic filter is proximate a local maximum.

12. The optoelectronic filter of claim 1 wherein the modulator circuit is a Mach-Zehnder modulator.

13. The optoelectronic filter of claim 1 wherein the light source comprises a light emitting diode (LED), and/or a laser diode.

14. A method of filtering received signals in an optoelectronic filter, the method comprising:

receiving first and second radio frequency (RF) signals at an input of the optoelectronic filter, wherein the first RF signal is provided having a first power level and the second RF signal is provided having a second, lower power level;

adjusting the power level of the first RF signal and/or the power level of the second RF signal to produce a level adjusted signal; and generating a modulated signal from the level adjusted signal at an output of a modulator circuit, wherein the power level of the first RF signal and/or the power level of the second RF signal is adjusted such that the first RF signal transitions from constructive to destructive interference in the modulator circuit, and wherein the first RF signal is suppressed relative to the second RF signal in the modulated signal.

15. In a communication system, a receiver coupled to receive first and second radio frequency (RF) signals from one or more remote locations, wherein the first RF signal is provided having a first power level and the second RF signal is provided having a second, different power level, said receiver comprising:

an optoelectronic filter having at least one input configured to receive the first and second RF signals and an output, the optoelectronic filter comprising:

a signal level control circuit having an input coupled to the at least one optoelectronic filter input, said signal level control circuit configured to: receive the first and second RF signals at the input thereof, adjust a power level of the first RF signal and/or a power level of the second RF signal, and in response thereto provide a level-adjusted signal at an output thereof;

a modulator circuit having at least first and second inputs with a first one of the modulator circuit inputs coupled to the signal level control circuit output, said modulator circuit configured to receive the level-adjusted signal at the first one of the modulator circuit inputs and in response thereto generate a modulated signal at an output thereof; and a light source coupled to a second one of the modulator circuit inputs, said light source configured to provide a beam having an optical intensity to the second one of the modulator circuit inputs, wherein the signal level control circuit adjusts the power level of the first RF signal and/or a power level of the second RF signal such that the first RF signal transitions from constructive to destructive interference in said modulator circuit, wherein the first RF signal is suppressed relative to the second RF signal in the modulated signal.

16. The receiver of claim 15 wherein the optical intensity of the beam is selected to provide gain to the modulated signal.

17. The receiver circuit of claim 15 wherein said modulator circuit of the optoelectronic filter is configured to generate the modulated signal upon detection of an optical envelope of the level-adjusted signal and propagation of the beam through said modulator circuit.

18. The receiver of claim 15 wherein the signal level control circuit adjusts the power level of the first RF signal and/or the power level of the second RF signal using a respective plurality of attenuation or gain factors.

19. The receiver of claim 15 wherein the signal level control circuit also has an input coupled to the modulator circuit output, said signal level control circuit configured to: receive the modulated signal at the input thereof and adjust signal levels of one or more respective portions of the modulated signal representative of the power level of the first RF signal and/or the power level of the second RF signal.

20. The receiver of claim 15 wherein the optoelectronic filter further comprises:

a detector circuit having an input coupled to the modulator circuit output, said detector circuit configured to receive the modulated signal at the input thereof and to provide a detected signal at an output thereof.

* * * * *